(12) United States Patent
Weingartz et al.

(10) Patent No.: US 9,360,109 B2
(45) Date of Patent: Jun. 7, 2016

(54) METHOD OF CONTROLLING A SYNCHRONIZER ACTUATOR FORK OF A TRANSMISSION

(71) Applicant: GM GLOBAL TECHNOLOGY OPERATIONS LLC, Detroit, MI (US)

(72) Inventors: Christopher Jay Weingartz, Holly, MI (US); Glenn W. Hoefflin, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 115 days.

(21) Appl. No.: 14/254,488

(22) Filed: Apr. 16, 2014

(65) Prior Publication Data

US 2015/0300485 A1 Oct. 22, 2015

(51) Int. Cl.
| | |
|---|---|
| *B60K 17/10* | (2006.01) |
| *F16H 59/02* | (2006.01) |
| *F16H 61/28* | (2006.01) |
| *F16H 61/04* | (2006.01) |
| *F16H 61/30* | (2006.01) |

(52) U.S. Cl.
CPC ........ *F16H 61/2807* (2013.01); *F16H 61/0403* (2013.01); *F16H 61/30* (2013.01); *F16H 2061/0474* (2013.01); *F16H 2061/2823* (2013.01)

(58) Field of Classification Search
CPC ................ F16H 2061/2823; F16H 2061/2853; F16H 61/705

USPC .......................... 74/335, 339, 473.11, 473.36
See application file for complete search history.

(56) References Cited

U.S. PATENT DOCUMENTS

| | | | | |
|---|---|---|---|---|
| 2,318,481 | A * | 5/1943 | Greenlee ................. | F16D 67/00 475/143 |
| 4,576,063 | A * | 3/1986 | Akashi .................... | F16H 3/006 74/331 |
| 5,425,688 | A * | 6/1995 | Raszkowski ........ | F16H 61/0272 477/116 |
| 2007/0281823 | A1* | 12/2007 | Hun ........................ | F16D 23/06 475/303 |

* cited by examiner

*Primary Examiner* — Ha D Ho
(74) *Attorney, Agent, or Firm* — Quinn Law Group, PLLC (57) ABSTRACT

A method of controlling movement of an actuator fork and attached synchronizer sleeve of a transmission through a pre-synchronization phase of a synchronization event at a pre-synchronization fork velocity below a breakaway velocity such that a strut is retained to the sleeve by a ball plunger for the duration of the pre-synchronization phase. A method of adjusting one of a pressure signal and a flow signal to an actuator piston to control movement of the actuator fork includes moving the fork from an initial disengaged position through a pre-synchronization phase of a synchronization event by controlling one of a pre-synchronization fluid pressure value and flow value, where the controlled pre-synchronization fluid value is less than a threshold value corresponding to a breakaway force of a ball plunger configured to selectively retain a strut assembly to a synchronizer sleeve operatively attached to the actuator fork.

20 Claims, 6 Drawing Sheets

METHOD OF CONTROLLING A SYNCHRONIZER ACTUATOR FORK OF A TRANSMISSION

TECHNICAL FIELD

The invention generally relates to a method of controlling a transmission, and more specifically to a method of adjusting a signal to an actuator piston to control movement of a synchronizer actuator fork of the transmission.

BACKGROUND

In vehicular transmissions, such as but not limited to a dual clutch transmission and an automatic manual transmission, synchronizers are used to engage the different gears to achieve the different gear ratios. The synchronizer includes a synchronizer hub fixedly mounted to a shaft of the transmission, a slidable sleeve meshingly engaged with the hub, and a blocker ring mounted on the shaft between the hub and the gear to be engaged. During a synchronization event, the sleeve is moved by an actuator fork that slides the sleeve axially relative to the shaft axis across the blocker ring and into interlocking engagement with a gear. The synchronization event includes a pre-synchronization phase followed by a synchronization phase. The timing, position and movement of the actuator forks must be precisely controlled to control the timing, position and movement of the sleeve attached thereto during the synchronization event to obtain consistent, smooth shifts.

The actuator forks may be controlled, for example, by a pressure solenoid that applies a fluid pressure to a first side of an actuator piston, and a flow solenoid disposed in series with the pressure solenoid and controlling fluid flow from a second side of the actuator piston. Movement of the actuator piston moves the actuator fork. The magnitude of the fluid pressure applied to the first side of the actuator piston determines how fast the actuator piston moves, and thereby how fast the actuator fork moves. An increase in the fluid pressure applied to the first side of the actuator piston increases the velocity at which the actuator fork moves, thereby decreasing the time elapsed during movement of the actuator fork from an initial disengaged position through the pre-synchronization phase and through the synchronization phase to a target engaged position. In contrast, a decrease in the fluid pressure applied to the first side of the actuator piston decreases the velocity at which the actuator fork moves, thereby decreasing the time elapsed during movement of the actuator fork from an initial disengaged position through the pre-synchronization phase and through the synchronization phase to an engaged target position.

SUMMARY

During a pre-synchronization phase of a synchronization event, the synchronizer sleeve moves axially relative to the synchronizer hub. A strut assembly disposed between the hub and the sleeve is selectively retained to the sleeve and is moved by the sleeve such that a strut of the strut assembly contacts and subsequently exerts a moving force on a blocker ring, to move the blocker ring into rotating frictional contact with the gear to be engaged with the shaft. This rotating frictional contact results in the blocker ring indexing prior to the sleeve contacting it thus preventing the sleeve from contacting the gear to be engaged prior to synchronization being completed. In one example, the strut assembly includes a ball plunger configured to be selectively retained in a detent defined by the sleeve, such that when the ball plunger is retained in the detent, the strut assembly is retained to the sleeve. The ball plunger is characterized by a breakaway force, such that when a sleeve force exerted on the ball plunger by the sleeve exceeds the breakaway force, the ball plunger is released from the detent, releasing the strut assembly from the sleeve.

When the strut is released from the sleeve prior to completion of the pre-synchronization phase, the non-retained strut does not engage the blocker ring, such that the blocker ring does not synchronize the gear to the hub prior to movement of the sleeve through the synchronization phase, resulting in the teeth of the sleeve clashing with the gear dog teeth during gear engagement, which may cause noise, shift roughness and/or inconsistency, and wear on the sleeve teeth and the gear dog teeth. The sleeve force exerted by the sleeve on the ball plunger is influenced by the fork velocity, e.g., as the velocity of the actuator fork and the sleeve moved by the actuator fork increase, the sleeve force exerted by the sleeve on the ball plunger is increased such that the sleeve force is at least partially defined by the fork velocity. Accordingly, it is advantageous to control the velocity of the actuator fork and the attached sleeve below a breakaway velocity, such that the sleeve force exerted on the ball plunger does not exceed the breakaway force required to displace the ball plunger from the detent during the pre-synchronization phase. A method of controlling a transmission including a shaft, the shaft having a synchronizer and a gear mounted thereon, is provided. The method includes controlling the velocity of the actuator fork during the pre-synchronization phase below the breakaway velocity, where below the breakaway velocity the ball plunger of the strut assembly is retained in the detent of the sleeve such that the strut moves with the sleeve during the pre-synchronization phase and the sleeve via the retained strut exerts a moving force on the blocker ring to index the blocker ring during the pre-synchronization phase.

The method includes moving, at a controlled and predetermined pre-synchronization fork velocity, an actuator fork and a synchronizer sleeve of the synchronizer operatively attached to the actuator fork in a gear engagement direction from an initial disengaged position through a pre-synchronization phase of a synchronization event to a final pre-synchronization position. The synchronizer includes a synchronizer sleeve in meshing engagement with a hub fixedly mounted to the shaft, and a ball strut assembly disposed between the hub and the sleeve. The actuator fork is operatively connected to an actuator which is actuable to move the fork and the attached sleeve axially relative to an axis defined by the shaft. The ball strut assembly includes a strut and a ball plunger configured such that the ball strut assembly is axially movable by axial movement of the sleeve when the ball plunger is selectively retained by a detent defined by the sleeve. When the ball plunger is positioned in contact with the detent during axial movement of the sleeve by the fork, the sleeve exerts a sleeve force on the ball plunger where the magnitude of the sleeve force is influenced by the fork velocity, e.g., such that the magnitude of the sleeve force increases with an increase in fork velocity, and decrease with a decrease in fork velocity. The ball plunger is characterized by a breakaway force such that when the sleeve force is greater than the breakaway force the ball plunger is displaced from the detent, thereby releasing the strut from the sleeve. The breakaway force is influenced by, e.g., partially determined by, the breakaway velocity. The method further includes controlling the pre-synchronization fork velocity below the breakaway velocity for the duration of the pre-synchronization phase such that the strut is retained to the sleeve for the duration of the pre-synchronization phase.

The method may include periodically sensing a position of the fork relative to the starting pre-synchronization position during the pre-synchronization phase and adjusting the pre-synchronization fork velocity based on the position of the fork. The method may further include moving the actuator fork and the attached sleeve from the final pre-synchronization position through a synchronization phase to a target position such that the strut is released from the sleeve and the sleeve at the target position is in meshing engagement with the gear and the hub. In one example, the actuator fork and the attached sleeve are moved through the synchronization phase at a synchronization fork velocity which is different than the pre-synchronization fork velocity.

In one example, a method of adjusting a pressure signal to an actuator piston to control movement of the actuator fork of the transmission is provided. The movement of the actuator fork is controlled by a pressure solenoid applying fluid pressure to a first side of the actuator piston, and a flow solenoid disposed in series with the pressure solenoid and controlling fluid flow from a second side of the actuator piston. The method includes moving the actuator fork and a synchronizer sleeve of the synchronizer operatively attached to the actuator fork in a gear engagement direction from an initial disengaged position through a pre-synchronization phase of a synchronization event to the final pre-synchronization position by applying fluid pressure at a pre-synchronization fluid pressure value to the first side of the actuator piston. The actuator fork is operatively connected to the actuator piston such that the actuator piston is actuable to move the fork and the attached sleeve axially relative to an axis defined by the shaft. The ball strut assembly includes a strut and a ball plunger configured such that the ball strut assembly is axially movable by axial movement of the sleeve when the ball plunger is selectively retained by a detent defined by the sleeve. The sleeve exerts a sleeve force on the ball plunger during axial movement of the sleeve by the fork, wherein the magnitude of the sleeve force is defined by the fluid pressure and flow applied to the piston. The ball plunger is characterized by a breakaway force such that when the sleeve force is greater than the breakaway force the ball plunger is displaced from the detent, thereby releasing the strut from the sleeve, where the breakaway force correspond to a fluid pressure and flow threshold values. The method further includes controlling the pre-synchronization fluid pressure and flow values below the threshold values for the duration of the pre-synchronization phase such that the strut is retained to the sleeve for the duration of the pre-synchronization phase.

In one example, applying fluid pressure and flow at the pre-synchronization fluid pressure value during the pre-synchronization phase may include moving the fork and attached sleeve from the initial disengaged position at an initial pre-synchronization fluid pressure and flow value, and incrementally increasing the pre-synchronization fluid pressure value from the initial pre-synchronization fluid pressure value over the duration of the pre-synchronization phase to a final pre-synchronization fluid pressure value which is less than the fluid pressure threshold value. The method may further include periodically sensing a position of the fork relative to the starting pre-synchronization position during the pre-synchronization phase and adjusting the pre-synchronization fluid pressure value based on the position of the fork.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims. The figures are not necessarily to scale or proportion. Accordingly, the particular dimensions and applications provided in the drawings presented herein are not to be considered limiting.

Figure 1:
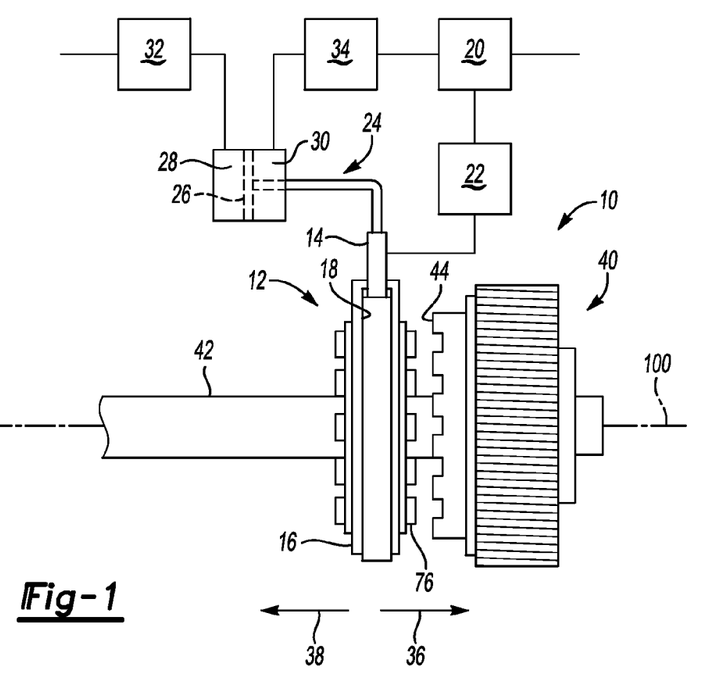
FIG. 1. is a fragmentary schematic plan view of a transmission including a synchronizer and an actuator fork in a disengaged position.

Referring to the figures, wherein like numerals indicate like parts throughout the several views, a transmission is generally shown at 10 in FIG. 1. The transmission 10 shown in fragmentary view in FIG. 1, by way of non-limiting example, may be one of an automated manual transmission and a dual clutch transmission. It should be appreciated that the invention may be utilized with other styles of transmission 10, not shown or described herein. The transmission 10 may include an input shaft (not shown) which may be operatively connected to an engine (not shown) to receive input torque from the engine. The transmission 10 ultimately delivers an output torque via an output shaft which may be used to drive, for example, some or all of the wheels (not shown) of a vehicle (not shown). The transmission 10 may further include a plurality of shafts including the shaft 42 shown in FIG. 1, and a plurality of gears including the gear 40 shown in FIG. 1. The plurality of gears is arranged such that each gear 40 is rotatably supported on one of the shafts 42 of the transmission 10 and in meshing engagement with at least one other gear 40 of the transmission 10. The shaft 42 is rotatable about an axis 100 of rotation, also referred to herein as the shaft axis 100.

The transmission 10 further includes at least one synchronizer 12 configured to rotatably couple at least one of the gears 40 to the shaft 42 upon which the gear 40 is rotatably supported, to engage that gear 40 of the transmission 10. In FIG. 1, the fragmentary view of the transmission 10 shows a shaft 42 defining a shaft axis 100, a gear 40 rotatably mounted on the shaft 42, and a synchronizer 12 mounted adjacent the gear 40, on the shaft 42. The synchronizer 12, which is shown in additional detail in FIG. 3, includes a synchronizer sleeve 16 which is meshingly engaged with a synchronizer hub 48, also referred to herein as a hub 48, such that the sleeve 16 is movable by an actuator fork 14, as indicated by the arrows shown in FIGS. 1 and 3-12, in an engagement direction 36 toward the gear 40 to be engaged, and in a disengagement direction 38, for example, to a disengaged position, which may be a neutral position. The actuator fork 14 is operatively attached to the synchronizer sleeve 16 by any suitable means such that the actuator fork 14 can exert an axial moving force on the sleeve 16, which may be exerted, for example, by movement of an actuator piston 26 of a synchronizer actuator generally indicated at 24. In the example shown in FIGS. 1 and 3, the sleeve 16 defines a fork slot or groove 18 configured to receive the fork 14 such that the fork 14 is operatively attached to the sleeve 16. The synchronizer hub 48 is fixedly attached to the shaft 42 such that the synchronizer 12 rotates with the shaft 42.

Figure 12:
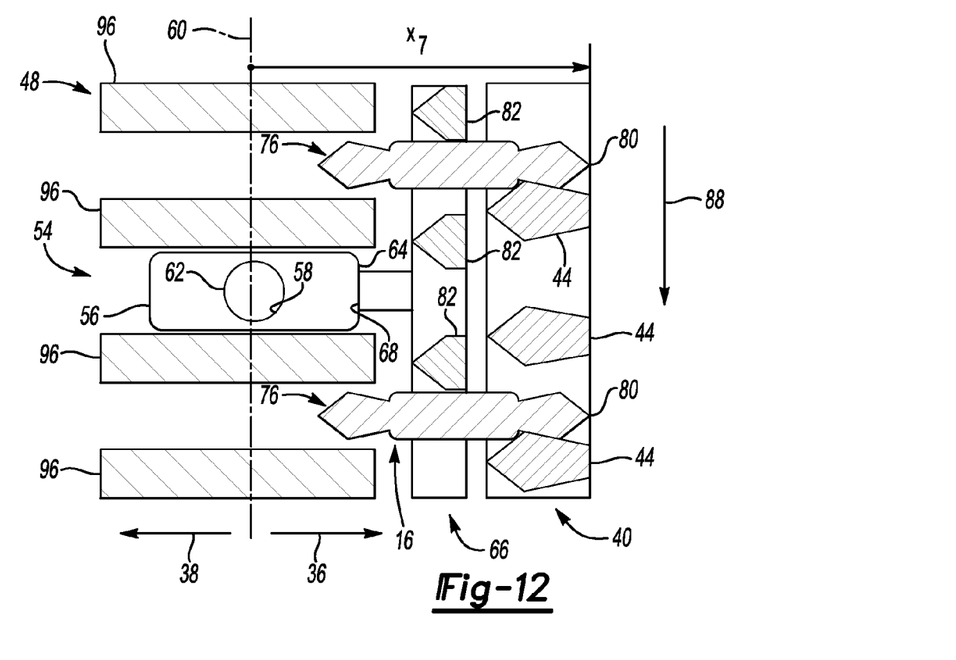
FIG. 12 is a schematic cross-sectional view of section 4-4 of FIG. 3 showing the synchronizer with the sleeve engaging the hub to the gear in a gear engaged position.

The synchronizer sleeve 16 includes first plurality of splines 76 defined by the inner diameter of the sleeve 16 and referred to herein as sleeve teeth 76. The synchronizer hub 48 includes a second plurality of splines 96 defined by the outer diameter of the hub 48 and referred to herein as hub splines 96. The sleeve teeth 76 and hub splines 96 meshingly engaged with each other as schematically illustrated in FIGS. 4-12 to meshingly engage the sleeve 16 to the hub 48. The sleeve 16 and sleeve teeth 76 are movable axially relative, respectively, to the hub 48 and hub splines 96 in the engagement direction 36 and in the disengagement direction 38. In a target engaged position, also referred to as a gear engaged position, the plurality of sleeve teeth 76 engage with a plurality of gear dog teeth 44 of the gear 40 to couple the gear 40 to the hub 48. FIG. 12 shows the synchronizer 12 in the gear 40 engaged position, where the sleeve teeth 76 are meshingly engages to the gear dog teeth 44 and to the hub splines 96 to couple the gear 40 to the hub 48 and thereby, to the shaft 42 upon which the hub 48 is mounted.

Figure 3:
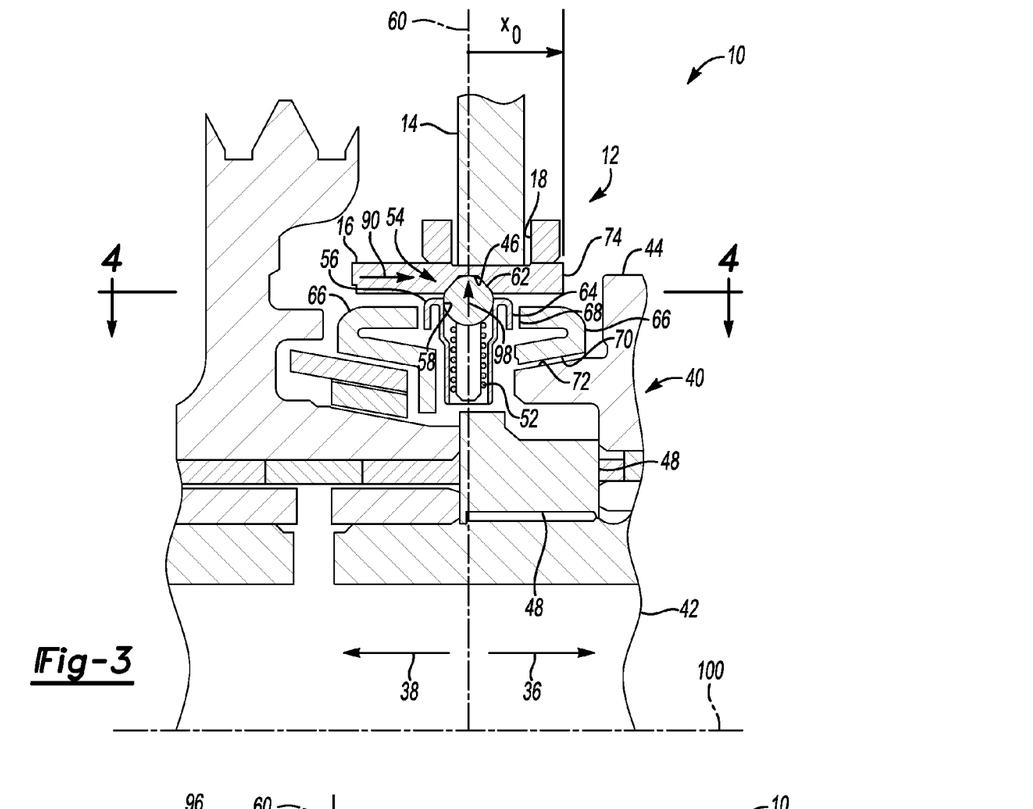
FIG. 3 is a fragmentary schematic cross-sectional view of a synchronizer showing the synchronizer and actuator fork in an initial disengaged position adjacent a gear.
Figure 6:
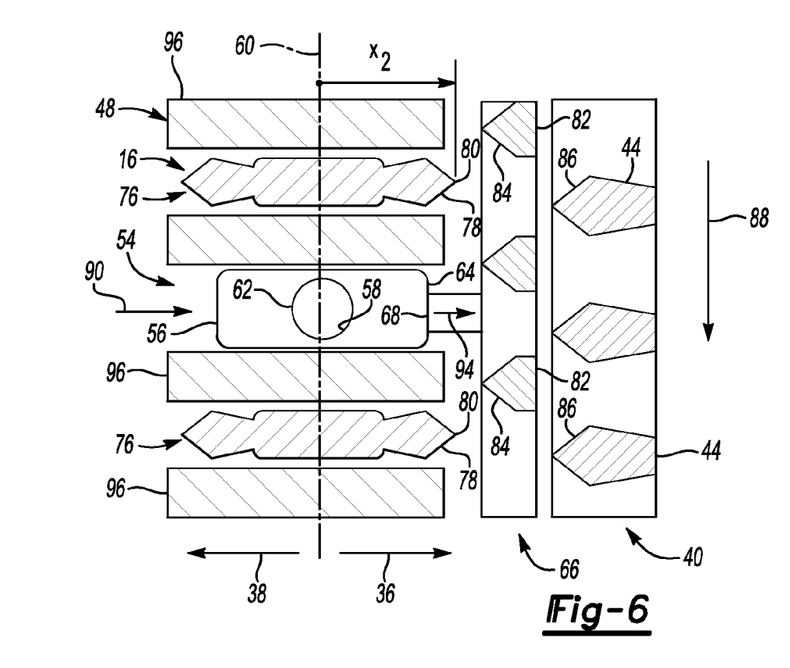
FIG. 6 is a schematic cross-sectional view of section 4-4 of FIG. 3 showing movement of the blocker ring by the strut and the sleeve to engage the gear during the pre-synchronization phase.
Figure 7:
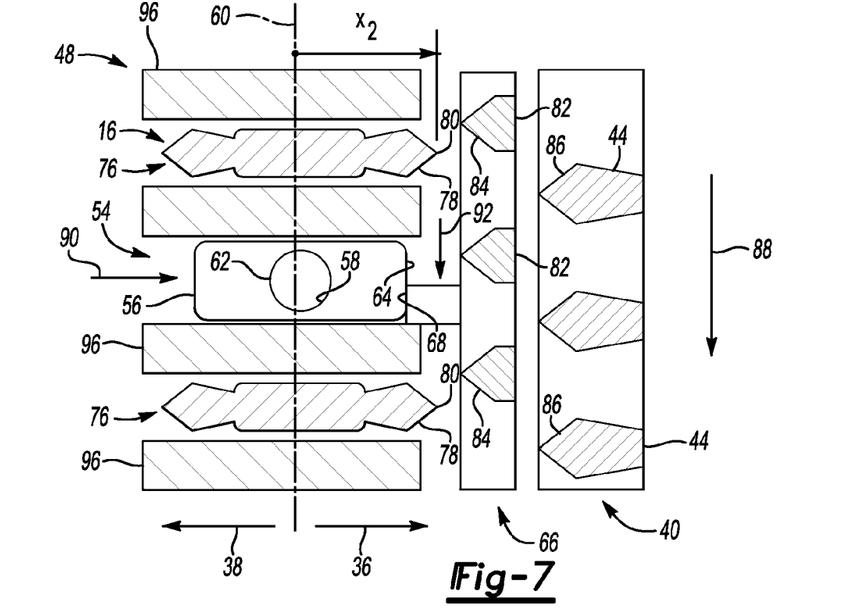
FIG. 7 is a schematic cross-sectional view of section 4-4 of FIG. 3 showing the blocker ring indexing to the sleeve and the hub during the transition from the pre-synchronization phase to a synchronization phase.

The synchronizer 12 further includes a blocker ring 66 having a plurality of blocker teeth 82 radially distributed such that the blocker teeth 82 may be indexed to the sleeve teeth 76 and to the gear dog teeth 44. The blocker ring 66 is positioned axially between the synchronizer hub 48 and the gear 40 to be engaged. The blocker ring 66 is movable axially in the engagement direction 36 by a strut 56 of a strut assembly 54 disposed between the hub 48 and the sleeve 16. The strut assembly 54 is axially moveable in the engagement direction 36 by the sleeve 16, as will be described in further detail herein, such that a strut face 64 of the strut 56 can contact a blocker ring interface 68 to exert a force on the blocker ring 66 to move the blocker ring 66 axially in the engagement direction 36. As shown in FIG. 3, the blocker ring 66 includes a blocker ring face 70 which when moved in contact with a gear face 72 of the gear 40 by the blocker ring 66 makes rotating frictional contact with the gear 40 such that over a transition time period from the pre-synchronization phase to the synchronization phase of a synchronization event the rotational speed of the blocker ring 66 and the rotational speed of the gear 40 are equalized to equalize the rotational speed of the gear 40 with the rotational speed of the synchronizer hub 48 and sleeve 16. With the blocker ring 66 moved in contact with the gear 40 by the strut 56, the blocker interface 68 is constrained between adjacent hub splines 96, as shown in FIG. 6, such that when the blocker ring face 70 and gear face 72 meet in rotating frictional contact the blocker ring 66 is indexed in the direction of rotation 88 indicated in the figures by arrow 88, until the blocker interface 68 interferes with an adjacent hub spline 96 as shown in by the index arrow 92 in FIG. 8, at which time the rotational speed of each of the gear 40, blocker ring 66, hub 48, and sleeve 16 meshingly engaged to the hub 48 become equalized. In a non-limiting example shown in FIG. 3, the blocker ring face 70 and gear face 72 are each configured as a cone surface such that the blocker ring face 70 and gear face 72 engage along the tapered cone surfaces of the respective gear and blocker ring faces 72, 70.

The strut assembly 54, best shown in FIG. 3, includes a strut 56 defining a strut face 64 configured to contact the blocker interface 68 and a ball plunger 62 housed in the strut assembly 54. The ball plunger 62 and a compression spring 52 are arranged in a ball pocket 58 such that the ball plunger 62 is spring loaded by the compression spring 52 such that the ball plunger 62 exerts a plunger force 98 defined by the compression spring 52 against the sleeve 16 when in contact with the sleeve 16. The ball plunger 62 is configured to interface with a detent 46 defined by the sleeve 16, for example and as shown in FIG. 3, such that the ball plunger 62 may be selectively retained in the detent 46 to retain the strut assembly 54 to the sleeve 16, and such that the strut assembly 54 is axially moveable by movement of the sleeve 16 when the ball plunger 62 is retained in the strut 56. As shown in FIG. 3, when the sleeve 16 is moved axially with the ball plunger 62 retained in the detent 46, the sleeve 16 exerts a sleeve force 90 indicated by arrow 90 against the ball plunger 62.

The ball plunger 62 is characterized by a breakaway force, such that when a sleeve force 90 exerted on the ball plunger 62 by the sleeve 16 is less than the breakaway force, the sleeve force 90 is insufficient to overcome the plunger force 98 exerted by the ball plunger 62 on the detent 46 and the ball plunger 62 is retained in the detent 46. When the sleeve force 90 exerted on the ball plunger 62 by the sleeve 16 exceeds the breakaway force, the ball plunger 62 is released from the detent 46, releasing the strut assembly 54 from the sleeve 16. The magnitude of the sleeve force 90 exerted by the sleeve 16 on the ball plunger 62 is proportional to the velocity of the sleeve 16 as it is moved axially by the fork 14, e.g., as the velocity of the fork 14 and the attached sleeve 16 increases, the magnitude of the sleeve force 90 increases. At a breakaway fork 14 velocity, the sleeve force 90 is equivalent to the breakaway force. When the fork 14 velocity, and therefore the sleeve 16 velocity of the attached sleeve 16, is below the breakaway fork 14 velocity, also referred to herein as the breakaway velocity, the sleeve force 90 is insufficient to displace the ball plunger 62 from the detent 46 and the strut assembly 54 is retained via the ball plunger 62 and detent 46 to the sleeve 16 such that the strut 56 is moved by axial movement of the sleeve 16 by the fork 14. When the fork 14 velocity is at or exceeds the breakaway velocity, the sleeve 16 velocity is sufficient to displace the ball plunger 62 from the detent 46 such that the strut assembly 54 is released from the sleeve 16 and the released strut 56 is no longer moved with movement of the sleeve 16.

When the strut 56 is released from the sleeve 16 prior to completion of the pre-synchronization phase, the non-retained strut 56 does not engage the blocker ring 66, such that the blocker ring 66 does not synchronize the gear 40 to the hub 48 prior to movement of the sleeve 16 through the synchronization phase, and such that the rotational speed of the gear 40, sleeve 16 and hub 48 is not equalized prior to continued axial movement of the sleeve 16 toward the gear 40. In this event, e.g., where the blocker ring 66 has not synchronized the hub 48 to the gear 40 due to a premature release of the strut 56, e.g., a release of the strut 56 prior to synchronization, continued axial movement of the sleeve 16 in the engagement direction 36 may result in the sleeve teeth 76 clashing with the blocker teeth 82 and/or the gear dog teeth 44 during the synchronization event including gear 40 engagement, which may cause noise, shift roughness and/or inconsistency, and wear on the sleeve teeth 76 and the gear dog teeth 44. Accordingly, it is advantageous to control the velocity of the actuator fork 14 and the attached sleeve 16 below the breakaway velocity, thereby controlling the sleeve force 90 below the breakaway force to retain the ball plunger 62 in the detent 46 during the pre-synchronization phase, and such that the strut 56 retained thereby can exert the axial force 94 (see FIG. 6) to engage the blocker ring 66 and the gear 40 to synchronize the gear 40 and hub 48 before axial travel of the sleeve 16 to engage the sleeve teeth 76 to the blocker teeth 82 and subsequently to the gear dog teeth 44.

The actuator fork 14 is actuable to move the synchronizer sleeve 16, also referred to herein as the sleeve 16, in the engagement direction 36 to engage the synchronizer 12 to the gear 40, thereby coupling the gear 40 to the hub 48 and shaft 42. The actuator fork 14 is also actuable to move the sleeve 16 in the disengagement direction 38 to disengage the synchronizer 12 from the gear 40, thereby decoupling the gear 40 from the hub 48 and shaft 42. It should be appreciated that while only one actuator fork 14 is shown for clarity, the transmission 10 includes multiple actuator forks 14 to move multiple respective sleeves 16 of the various multiple synchronizers 12 into and out of engagement with their associated gears 40 during operation of the transmission 10. The movement of each of the actuator forks 14 is controlled by a pressure solenoid 32, which applies fluid pressure to a first side 28 of the actuator piston 26 to move the piston 26 in an engagement direction 36, in the example shown, and a flow solenoid 34 disposed in series with the pressure solenoid 32, which controls fluid flow from a second side 30 of the actuator piston 26. The velocity at which the piston 26 and the fork 14 attached thereto is moved is proportional to the applied fluid pressure, such that as the applied fluid value increases, the velocity of the fork 14 and the sleeve 16 attached thereto increases, as does the force output by the sleeve 16 in contact with other components of the system, including the strut assembly 54 disposed between the sleeve 16 and the hub 48 as shown in FIG. 3. For example, the sleeve 16 is moved by the actuator fork 14 attached thereto, as shown in FIG. 1, such that the magnitude of the sleeve force 90 exerted by the sleeve 16 on the ball plunger 62 is proportional to the fork 14 velocity.

The transmission 10 may include a control module 20, such as but not limited to a transmission controller 20, to control the operation of the transmission 10. The control module 20 may include a computer and/or processor, and include all software, hardware, memory, algorithms, connections, sensors 22, etc., necessary to manage and control the operation of the transmission 10. As such, a method of controlling a transmission 10, such as but not limited to the exemplary transmission 10 described herein, may be embodied as a program operable on the control module 20. It should be appreciated that the control module 20 may include any device capable of analyzing data from various sensors 22, comparing data, making the necessary decisions required to control the operation of the transmission 10, and executing the required tasks necessary to control the operation of the transmission 10.

In order to get fast responding, smooth operation from the transmission 10 during a synchronization event, the movement of each synchronizer 12 must be consistent and predictable. Accordingly, the method of controlling the transmission 10 described herein provides consistent and predictable movement of the synchronizer 12 to ensure quick, smooth shifts by controlling the fork velocity of the fork 14 below the breakaway velocity during the pre-synchronization phase of the synchronization event, to ensure the strut 56 is retained to the sleeve 16 during pre-synchronization such that the retained strut 56 can exert an axial force 94 on the blocker ring 66 to engage the blocker ring 66 to the gear 40 such that the blocker ring 66 remains indexed to the sleeve 16 and hub 48 during the synchronization phase following the pre-synchronization phase. The method adjusts the pressure signal to the actuator piston 26 operatively attached to the actuator fork 14, to control movement and velocity of the actuator fork 14 and the sleeve 16 operatively attached to the fork 14. While the method is herein described in relation to the transmission 10 shown in FIG. 1, which may be one of an automated manual transmission 10 and a dual clutch transmission 10, it should be appreciated that the method may be applied to other types of transmissions 10 not shown or described herein.

The method includes providing a control module 20 operable to control the transmission 10. As noted above, the control module 20 includes all software, hardware, memory, algorithms, connections, sensors 22, etc. necessary to manage and control the operation of the transmission 10. The control module 20 is operable to perform the various tasks of the method described below, including controlling the fork 14 velocity of the actuator fork 14 and attached sleeve 16 during a synchronization event. The control module 20 may also be referred to herein as the controller 20. In the method provided herein, the controller 20 is operable to control the actuator 24 and fork 14 to move at a pre-synchronization velocity from the initial disengaged position to the final pre-synchronization position, where the pre-synchronization velocity is less than the breakaway velocity required to release the strut 56 from the sleeve 16 during the pre-synchronization phase. The controller 20 is operable to control the fork 14 velocity during the synchronization phase at a synchronization velocity, which may be the same as or different from the pre-synchronization velocity.

The controller 20 may be operable to control movement of the actuator fork 14 from the initial disengaged position through the pre-synchronization phase to the final pre-synchronization position. For example, the controller 20 may be operable to measure the time required to move the actuator fork 14 from a first position to a second position during the pre-synchronization phase where the first position is one of the initial disengaged position, the starting position, and another position axially between the initial disengaged position and the final pre-synchronization position, and the second position is one of the final pre-synchronization position and another position axially between the first position and the final pre-synchronization position, and to determine if the measured time is less than a predefined minimum time for moving from the first position to the second position while exerting less than the breakaway force such that the controller 20 can adjust the pre-synchronization fluid pressure value to a lower value when the measured time is less than the predefined minimum time.

Figure 2:
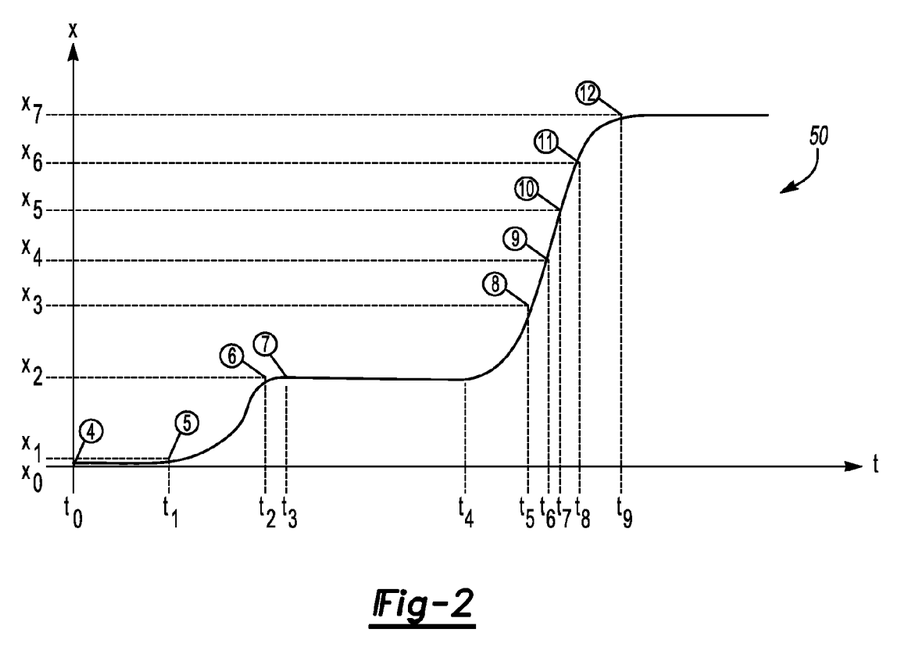
FIG. 2 is a graph relating a position of the actuator fork to time during a synchronization event including a pre-synchronization phase and a synchronization phase.
Figure 4:
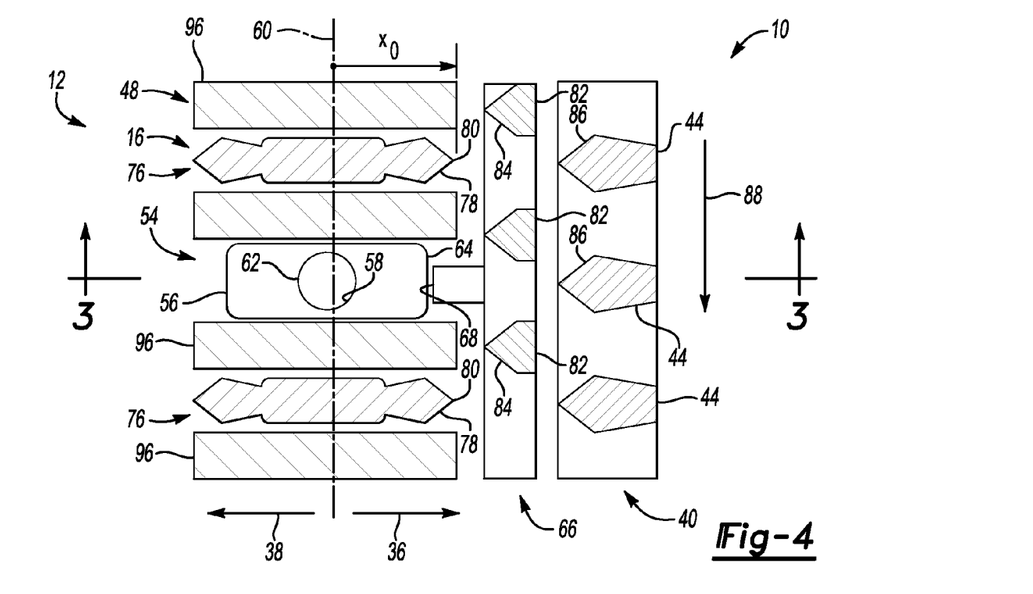
FIG. 4 is a schematic cross-sectional view of section 4-4 of FIG. 3 showing the synchronizer including a hub, a strut assembly, a synchronizer sleeve, and a blocker ring in the initial disengaged position adjacent the gear.
Figure 5:
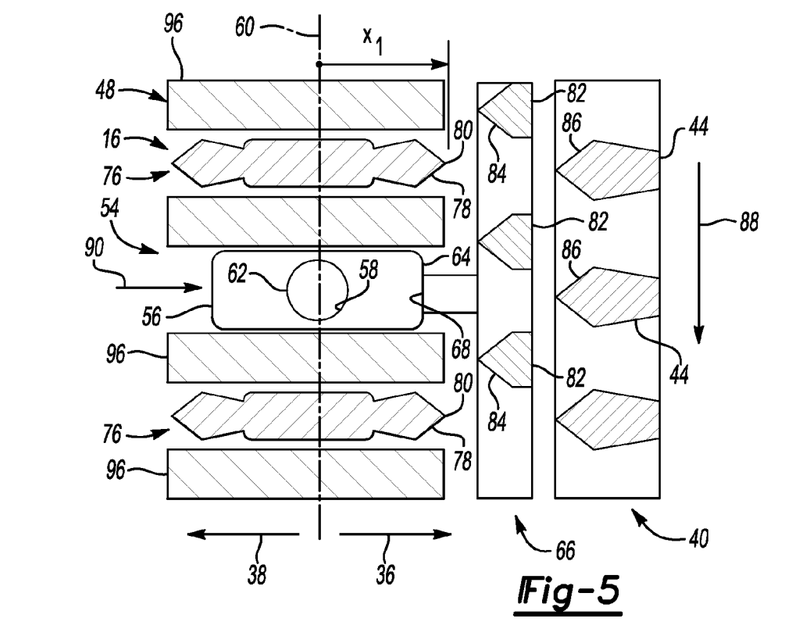
FIG. 5 is a schematic cross-sectional view of section 4-4 of FIG. 3 showing movement of the strut assembly by the synchronizer sleeve to engage the blocker ring during a pre-synchronization phase of a synchronizing event.

Referring to the graph 50 shown in FIG. 2, the position x of the actuator fork 14 relative to a position is shown along a vertical axis, and time t is shown along a horizontal axis. The position datum 60, which is shown in FIGS. 3-12 is shown as a plane bisecting the ball plunger 62 when the ball plunger 62 is fully retained in and aligned to the detent 46 of the sleeve 16, as shown in FIG. 3, and the transverse centerline of the sleeve 16 is aligned to the transverse centerline of the hub 48 as shown in FIGS. 3 and 4, such that the strut assembly 54 is in a neutral position relative to the hub 48, e.g., not displaced from the hub 48 by the sleeve 16 in either of the engagement or disengagement directions 36, 38. The position x of the actuator fork 14 is determined relative to the tips 80 of the sleeve teeth 76 at the engaging side of the sleeve 16, e.g., at the sleeve face 74 (see FIG. 3) which first engages with the blocking ring and/or gear 40 to be coupled with the hub 48 during a synchronization event, and as shown in FIGS. 3-12, when the sleeve 16 is being moved axially in the engagement direction 36. Change in the position x along the vertical axis represents movement of the fork 14 and attached sleeve 16 relative to the datum 60 during a synchronization event. Change in the time t along the horizontal axis represents the elapsed time during the synchronization event. The encircled reference numbers shown in the graph 50 refer to the various FIGS. 4-12 in the figures. For example, referring to the graph 50, position and time $x_0, t_0$ are associated with the encircled reference number "4" on the graph 50 to indicate that at position $x_0$ and time $t_0$ the components of the transmission 10 are positioned relative to each other as shown in FIG. 4, position and time $x_1, t_1$ are associated with the encircled reference number "5" on the graph 50 to indicate that at position $x_1$ and time $t_1$ the components of the transmission 10 are positioned relative to each other as shown in FIG. 5, position and time $x_2, t_2$ are associated with the encircled reference number "6" on the graph 50 to indicate that at position $x_2$ and time $t_2$ the components of the transmission 10 are positioned relative to each other as shown in FIG. 6, and so on.

The fork 14 velocity as the fork 14 moves between any two positions may be calculated by the change in position divided by the change in time. For example, the fork 14 velocity of the fork 14 as it moves from an initial pre-synchronization position $x_0$ to an intermediate pre-synchronization position $x_1$ may be calculated as $(x_1-x_0)/(t_1-t_0)$. The method disclosed herein may include determining the fork 14 velocity as the fork 14 and attached sleeve 16 is moved axially during a synchronization event, using, for example, using the controller 20 and position sensor 22 shown in FIG. 1 to calculate the velocity, where the controller 20 is configured to measure the time t, and the position sensor 22 is configured to sense the position x relative to the datum 60 and to communicate the position x to the controller 20. The controller 20 is in communication with the position sensor 22 and the actuator 24 such that the controller 20 may command the actuator 24 to adjust the fluid pressure applied to the first side 28 of the actuator piston 26 and/or to control the fluid flow from the second side 30 of the actuator piston 26 in response to one or more of the time t, position x and fork 14 velocity, to control movement of the fork 14 and attached sleeve 16 at a pre-determined velocity during the synchronization event. In the method described herein, the controller 20 is configured to control the fork 14 velocity during the pre-synchronization phase of the synchronization event at a pre-determined velocity which is less than the breakaway velocity. The controller 20 is further configured to control the fork 14 velocity during the synchronization phase of the synchronization event at a synchronization velocity which may be the same as or different from the pre-synchronization velocity. For example, the synchronization velocity may be greater than the pre-synchronization velocity to minimize the elapsed time to complete the synchronization phase when retention of the strut 56 to the sleeve 16 is no longer required, to minimize the total time to complete the synchronization event, e.g., to couple the gear 40 to the hub 48.

Referring to FIG. 2 in conjunction with FIGS. 3-12, the synchronization event includes moving the fork 14 and attached sleeve 16 from an initial disengaged position (not shown) to a starting pre-synchronization position $x_0$ shown in FIG. 3. At the starting pre-synchronization position $x_0$, the ball plunger 62 is engaged in the detent 46 such that the strut assembly 54 including the strut 56 moves with the sleeve 16 in the engagement direction 36 when the fork 14 with the sleeve 16 attached is moved, for example, by the actuator 24 in the engagement direction 36. In the initial disengaged position the fork 14 and attached sleeve 16 may be positioned as shown in FIG. 3, such that the initial disengaged position and the starting pre-synchronization position $x_0$ are the same position. In another example, the fork 14 and attached sleeve 16 may be, in an initial disengaged position, positioned to the left of the starting pre-synchronization position $x_0$, e.g., moved in the disengagement position relative to the starting pre-synchronization position $x_0$, such that upon initiation of a synchronization event the fork 14 and attached sleeve 16 must be first moved from the initial disengaged position in the engagement direction 36 to the starting pre-synchronization position $x_0$ during the pre-synchronization event. In the method described herein, the fork 14 velocity is controlled as the fork 14 and attached sleeve 16 is moved from the initial disengaged position to the starting pre-synchronization position $x_0$ at a velocity less than the breakaway velocity, such that as the sleeve 16 moves relative to the ball plunger 62 and in the engagement direction 36, the ball plunger 62 has sufficient time to exert the plunger force 98 to become engaged in the detent 46. Fluid pressure may be applied to the first side 28 of the piston 26 at an initial fluid pressure value and/or fluid flow may be controlled from the second side 30 of the piston 26 at an initial flow value when moving the fork 14 from the initial disengaged position to the starting pre-synchronization position to ensure sufficient elapsed time and movement of the fork 14 at a velocity sufficiently below the breakaway velocity to allow the compression spring 52 to react and the ball plunger 62 to exert a plunger pressure on the detent 46 to retain the ball plunger 62 in the detent 46 at the starting pre-synchronization position.

The pre-synchronization phase of the synchronization event and the method continue as shown in FIG. 5, where the fork 14 and attached sleeve 16 are actuated by the actuator 24 to move from the starting pre-synchronization position $x_0$ to an intermediate pre-synchronization position shown as $x_1$ on the graph 50 at time $t_1$, where the fork 14 velocity is controlled during movement from the pre-synchronization position $x_0$ to the intermediate synchronization position $x_1$ at a pre-synchronization fork velocity which is less than the breakaway velocity, such that as the fork 14 and attached sleeve 16 is moved to the intermediate pre-synchronization position $x_1$ the strut 56 retained via the ball plunger 62 to the sleeve 16 is moved in contact with a blocker ring interface 68 as shown in FIG. 5. The method continues with controlling the velocity of the actuator fork 14 below the breakaway velocity as the fork 14 and attached sleeve 16 are moved to the final pre-synchronization position $x_2$ at time $t_2$ such that the retained strut 56 is moved by the sleeve 16 to exert an axial force 94 on the blocker ring interface 68, as shown in FIG. 6, to move a blocker face (see FIG. 3) of the blocker ring 66 in frictional contact with a gear face 72 (see FIG. 3) of the gear 40, where at the point of contact the blocker ring 66, hub 48 and sleeve 16 are rotating at a first rotational speed, and the gear 40 is rotating at a second rotational speed.

As shown in the graph 50 of FIG. 2, the fork 14 and attached sleeve 16 remain at the final pre-synchronization position $x_2$ through a transitional time period from $t_2$ to $t_4$ during which the axial force 94 exerted on the blocker ring interface 68 by the strut 56 is maintained such that frictional contact is maintained between the blocker face and the gear face 72 through the transitional time period from $t_2$ to $t_4$ during which the rotational speed of the blocker and the rotational speed of the gear 40 are equalized, at time $t_4$ the gear 40, blocker ring 66, sleeve 16 and hub 48 are rotating at the same rotational speed. At an interim time $t_3$ during the transitional time period from $t_2$ to $t_4$, the frictional contact between the blocker ring 66 and gear 40 causes the blocker ring 66 to index as indicated by the index arrow 92 shown in FIG. 7, such that the blocker teeth 82 are indexed to the sleeve teeth 76 and hub splines 96, and the transition from the pre-synchronization phase to the synchronization phase of the synchronization event is complete.

Figure 8:
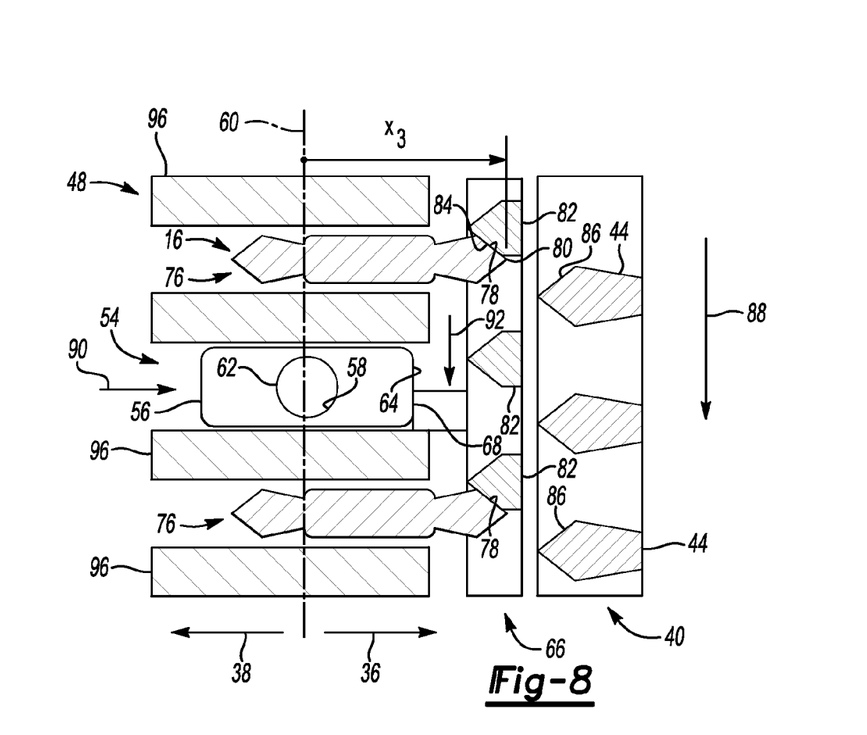
FIG. 8 is a schematic cross-sectional view of section 4-4 of FIG. 3 showing blocking travel of the sleeve during the synchronization phase of the synchronizing event.
Figure 9:
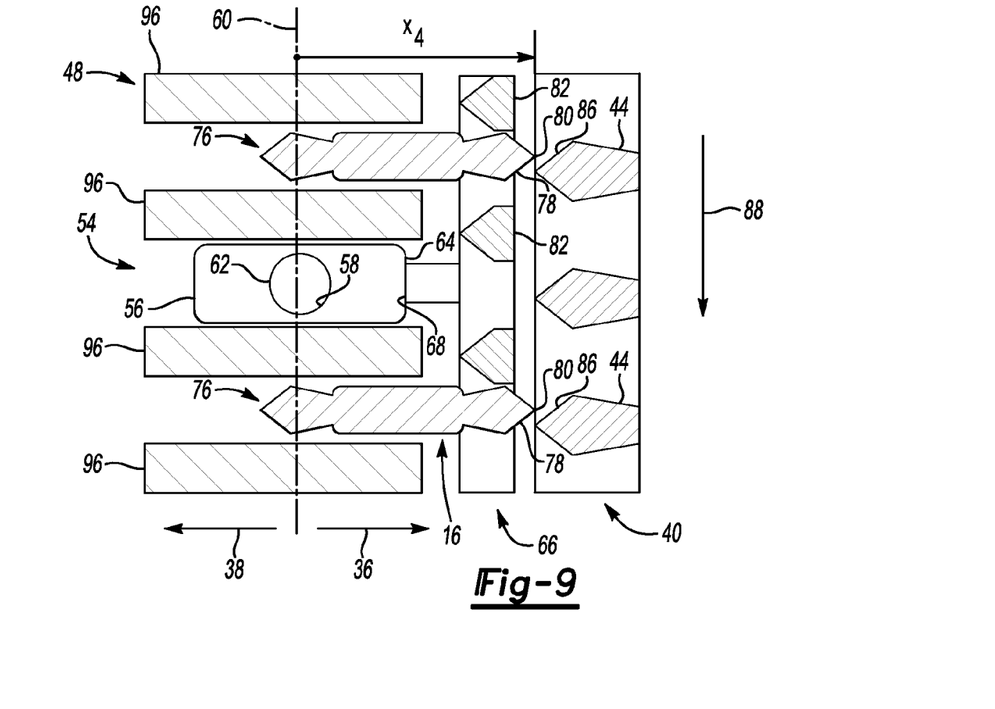
FIG. 9 is a schematic cross-sectional view of section 4-4 of FIG. 3 showing free flight travel of the sleeve during the synchronization phase.
Figure 10:
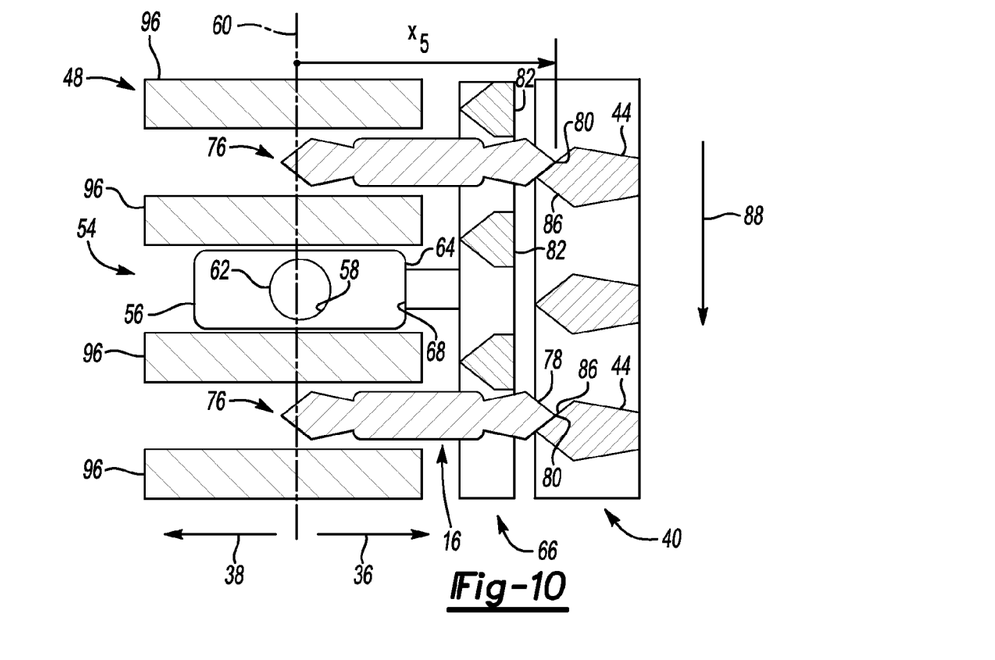
FIG. 10 is a schematic cross-sectional view of section 4-4 of FIG. 3 showing travel of the sleeve to tip contact of a tip of a spline of the sleeve to a spline of the gear during the synchronization phase.
Figure 11:
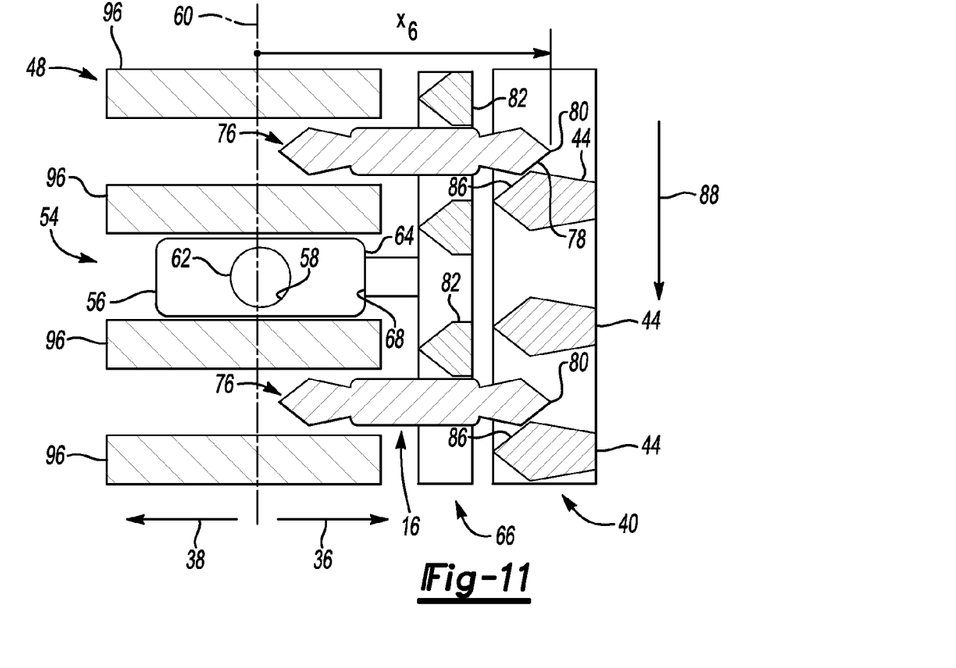
FIG. 11 is a schematic cross-sectional view of section 4-4 of FIG. 3 showing the gear indexing to the hub and sleeve during the synchronization phase.

Referring again to FIG. 2, at time $t_4$ the rotational speed of the blocker ring 66, hub 48, sleeve 16 and gear 40 are equalized and the fork 14 continues in the synchronization phase in blocking travel from position $x_2$ to position $x_3$ shown in FIG. 8, where the each respective sleeve tooth 76 contacts a respective blocker tooth 82. In the example shown in FIG. 8, each of the sleeve teeth 76, the blocker teeth 82, and the gear dog teeth 44 are chamfered. The sleeve tooth sleeve tooth chamfers 78 of each sleeve tooth 76 terminate in a spline tip 80. As shown in FIG. 8, during the synchronization phase the sleeve 16 progresses through blocking travel at a synchronization velocity such that the sleeve tooth tip 80 and sleeve tooth chamfer 78 of each respective sleeve tooth 76 contacts a blocker tooth chamfer 84 of a respective blocker tooth 82. During continued axial movement of the fork 14 in the engagement direction 36 during blocking travel from position $x_2$ shown in FIG. 7 to the position $x_3$ shown in FIG. 8 while the strut 56 is held in position in contact with the blocker interface 68 causes the sleeve force 90 to increase above the breakaway force and the ball plunger 62 to be displaced from the detent 46, releasing the strut assembly 54 from the sleeve 16, such that strut 56 which is no longer retained to the sleeve 16 ceases to exert an axial force 94 on the blocker interface 68 and blocker ring 66. The synchronization fork velocity during the blocking travel portion of the synchronization phase from time $t_4$ to time $t_5$ is controlled by the actuator 24 and may be the same as or different than the pre-synchronization velocity. In one example, the synchronization fork velocity may be greater than the pre-synchronization fork velocity to minimize the total elapsed time $t_0$ to time $t_9$ required to complete the synchronization event and couple the gear 40 to the hub 48.

The synchronization phase of the synchronization event continues as shown in FIGS. 9-12 and with reference to the graph 50 of FIG. 2, and terminates as shown in FIG. 12, when the sleeve teeth 76 are engaged with the gear dog teeth 44 and with the hub splines 96 to couple the gear 40 to the hub 48, with the gear 40 and hub 48 rotating at the same rotational speed. As shown in the graph 50 and FIGS. 8-12, the controller 20 actuates movement of the fork 14 and attached sleeve 16 at the synchronization velocity and in the engagement direction 36 from fork 14 position $x_2$ at time $t_4$ through blocking travel at fork 14 position $x_3$ at time $t_5$ shown in FIG. 8, through free flight travel shown in FIG. 9 and indicated at fork 14 position $x_4$ at time $t_6$. The fork 14 and attached sleeve 16 continue to travel to tip 80 contact at time $t_7$ and at position $x_5$ shown in FIG. 10, at which time $t_7$ the sleeve tooth 76 tips 80 contact the gear dog teeth 44 and contact between each sleeve tooth chamfer 78 and gear dog tooth chamfer 86 is initiated. The fork 14 and attached sleeve 16 continue to travel to time $t_8$ and position $x_6$ shown in FIG. 11, as gear 40 indexing occurs and the sleeve 16 indexes the gear dog teeth 44 to the hub splines 96. In a final step in the synchronization phase and as shown in FIG. 12, the synchronization phase and the synchronization event are completed at time $t_9$ when the fork 14 travels to position $x_7$, also referred to herein as the target position or the gear 40 engaged position, where the sleeve teeth 76 are meshingly engaged with the gear dog teeth 44 and with the hub splines 96 to couple the gear 40 to the hub 48.

The examples described herein of the method are non-limiting, and it would be understood the method can include other steps and/or combinations of steps within the scope of the disclosure provided herein. For example, the method may include periodically sensing a position of the fork 14 relative to the starting pre-synchronization position $x_0$ during the pre-synchronization phase and adjusting the pre-synchronization fork velocity based on the position $x$ of the fork 14. The method may further include moving the actuator fork 14 and the attached sleeve 16 from the final pre-synchronization position $x_2$ through a synchronization phase to the target position $x_9$ such that the strut 56 is released from the sleeve 16 and the sleeve 16 at the target position $x_9$ is in meshing engagement with the gear 40 and the hub 48. In one example, the actuator fork 14 and the attached sleeve 16 are moved through the synchronization phase at a synchronization fork velocity which is different than the pre-synchronization fork velocity. In another example, controlling the pre-synchronization fork velocity during the pre-synchronization phase below the breakaway velocity may include moving the fork 14 and attached sleeve 16 from the initial disengaged position at an initial pre-synchronization fork velocity and incrementally increasing the pre-synchronization fork velocity from the initial pre-synchronization fork velocity over the duration of the pre-synchronization phase to a final pre-synchronization fork velocity which is less than the breakaway velocity. The method may include sensing a position of the fork 14 relative to the starting pre-synchronization position at a predetermined time during the pre-synchronization phase, and adjusting one of the applied fluid pressure value and the controlled fluid flow value to adjust the pre-synchronization fork velocity based on the sensed position of the fork 14.

By way of example, the method may include adjusting a fluid control signal provided to the actuator piston 26 to control movement of the actuator fork 14. The movement of the actuator fork 14 is controlled by the pressure solenoid 32 applying fluid pressure to the first side 28 of the actuator piston 26, and the flow solenoid 34 disposed in series with the pressure solenoid 32 and controlling fluid flow from the second side 30 of the actuator piston 26. The method includes moving the actuator fork 14 and a synchronizer sleeve 16 of the synchronizer 12 operatively attached to the actuator fork 14 in the gear 40 engagement direction 36 as previously described herein from the initial disengaged position through a pre-synchronization phase of a synchronization event to the final pre-synchronization position $x_2$, by at least one of applying fluid pressure at a pre-synchronization fluid pressure value to the first side 28 of the actuator piston 26 and controlling fluid flow at a pre-synchronization fluid flow value from the second side 30 of the actuator piston. The sleeve 16 exerts a sleeve force 90 on the ball plunger 62 during axial movement of the sleeve 16 by the fork 14. The magnitude of the sleeve force 90 is defined by the fluid pressure value applied to the piston 26. The ball plunger 62 is characterized by a breakaway force such that when the sleeve force 90 is greater than the breakaway force the ball plunger 62 is displaced from the detent 46, thereby releasing the strut 56 from the sleeve 16, where the breakaway force corresponds to at least one of a fluid pressure threshold value and a fluid flow threshold value. The method further includes controlling, for the duration of the pre-synchronization phase, at least one of the pre-synchronization fluid pressure value relative to, for example, below, the fluid pressure threshold value and the pre-synchronization fluid flow value relative to the fluid flow pressure value, such that the strut 56 is retained to the sleeve 16 for the duration of the pre-synchronization phase.

By way of example, the method may include moving the fork 14 and the attached sleeve 16 in the engagement direction 36 from the initial disengaged position to the starting pre-synchronization position $x_0$ by at least one of applying fluid pressure at the pre-synchronization fluid pressure value and controlling fluid flow at the pre-synchronization fluid flow value, where at the starting pre-synchronization position $x_0$ the ball plunger 62 is retained by the detent 46 of the sleeve 16 such that the strut 56 retained to the sleeve 16 by the ball plunger 62 is moveable in the engagement direction 36 by axial movement of the sleeve 16. The method may continue with moving the fork 14, the attached sleeve 16 and the retained strut 56 in the engagement direction 36 from the starting pre-synchronization position $x_0$ to the intermediate pre-synchronization position $x_1$ by at least one of applying fluid pressure at the pre-synchronization fluid pressure value and controlling fluid flow at the pre-synchronization fluid flow value, where at the intermediate pre-synchronization position $x_1$ the retained strut 56 makes contact with the blocker ring 66 of the synchronizer 12, where the blocker ring 66 is rotatably mounted on the shaft 42 and axially moveable between the synchronizer hub 48 and the gear 40. The method further continues with moving the fork 14, the attached sleeve 16 and the retained strut 56 at the pre-synchronization velocity in the direction of engagement 36 from the intermediate pre-synchronization position $x_1$ to the final pre-synchronization position $x_2$ at the one of the pre-synchronization fluid pressure value and the pre-synchronization fluid flow value, such that the retained strut 56 contacts the blocker ring 66 to move the blocker ring face 70 of the blocker ring 66 in frictional contact with the gear face 72 of the gear 40.

In one example, applying fluid pressure at the pre-synchronization fluid pressure value during the pre-synchronization phase may include moving the fork 14 and attached sleeve 16 from the initial disengaged position at an initial pre-synchronization fluid pressure value, and incrementally increasing the pre-synchronization fluid pressure value from the initial pre-synchronization fluid pressure value over the duration of the pre-synchronization phase to a final pre-synchronization fluid pressure value which is less than the fluid pressure threshold value. The method may further include periodically sensing a position of the fork 14 relative to the starting pre-synchronization position $x_0$ during the pre-synchronization phase and adjusting at least one of the pre-synchronization fluid pressure value and the pre-synchronization fluid flow value based on the position of the fork 14. In one example, the actuator fork 14 and the attached sleeve 16 may be moved by the actuator 24 and piston 26 through the synchronization phase by applying a synchronization fluid pressure value which is different than the pre-synchronization fluid pressure value. In another example, the method may include sensing a position of the fork 14 relative to one of the initial disengaged position and the starting pre-synchronization position $x_0$ at a predetermined time during the pre-synchronization phase and adjusting the pre-synchronization fluid pressure value based on the sensed position of the fork 14.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of controlling a transmission including a shaft, the shaft having a synchronizer and a gear mounted thereon, the method comprising:
   moving, at a pre-synchronization fork velocity, an actuator fork and a synchronizer sleeve of the synchronizer operatively attached to the actuator fork in a gear engagement direction from an initial disengaged position through a pre-synchronization phase of a synchronization event to a final pre-synchronization position;
   the synchronizer including the synchronizer sleeve in meshing engagement with a hub fixedly mounted to the shaft, and a ball strut assembly disposed between the hub and the sleeve;
   wherein:
     the actuator fork is operatively connected to an actuator;
     the actuator is actuable to move the fork and the attached sleeve axially relative to an axis defined by the shaft;
     the ball strut assembly includes a strut and a ball plunger configured such that the ball strut assembly is axially movable by axial movement of the sleeve when the ball plunger is retained by a detent defined by the sleeve;
     the sleeve exerts a sleeve force on the ball plunger during axial movement of the sleeve by the fork, wherein the magnitude of the sleeve force is defined by the fork velocity;
     the ball plunger is characterized by a breakaway force such that when the sleeve force is greater than the breakaway force the ball plunger is displaced from the detent, thereby releasing the strut from the sleeve; and
     the breakaway force corresponds to a breakaway velocity;
   the method further comprising:
     controlling the pre-synchronization fork velocity below the breakaway velocity for the duration of the pre-synchronization phase such that the strut is retained to the sleeve for the duration of the pre-synchronization phase.

2. The method of claim 1, wherein the ball plunger includes the ball and a compression spring arranged in a ball pocket defined by the strut;
   the method further comprising:
   compressing the compression spring such that the ball exerts a plunger force on the detent when the ball is interfacing with the detent;
   wherein the plunger force is at least partially determined by the compression force of the compression spring; and
   wherein a breakaway threshold level is at least partially determined by the plunger force.

3. The method of claim 1, wherein the pre-synchronization phase includes:

moving the fork and the attached sleeve at the pre-synchronization velocity in the engagement direction from the initial disengaged position to a starting pre-synchronization position;

wherein at the starting pre-synchronization position the ball plunger is retained by the detent of the sleeve such that the strut retained to the sleeve by the ball plunger is moveable in the engagement direction by axial movement of the sleeve;

moving the fork, the attached sleeve and the retained strut at the pre-synchronization velocity in the engagement direction from the starting pre-synchronization position to an intermediate pre-synchronization position where the retained strut contacts a blocker ring of the synchronizer;

wherein the blocker ring is rotatably mounted on the shaft and axially moveable between the synchronizer hub and the gear; and moving the fork, the attached sleeve and the retained strut at the pre-synchronization velocity in the direction of engagement from the intermediate pre-synchronization position to the final pre-synchronization position such that the retained strut in contact with the blocker ring moves a blocker ring face of the blocker ring in frictional contact with a gear face of the gear.

4. The method of claim 3, further comprising:
transitioning from the pre-synchronization phase to a synchronization phase of the synchronization event by:
indexing the blocker ring to the gear; and
maintaining frictional contact between the blocker ring face and the gear face to equalize a blocker rotational speed of the blocker ring and a gear rotational speed of the gear;
wherein the fork and the attached sleeve maintain the final pre-synchronization position until the blocker rotational speed and the gear rotational speed are equalized.

5. The method of claim 3, wherein controlling the pre-synchronization fork velocity during the pre-synchronization phase below the breakaway velocity further comprises:
moving the fork and attached sleeve from the initial disengaged position at an initial pre-synchronization fork velocity; and
incrementally increasing the pre-synchronization fork velocity from the initial pre-synchronization fork velocity over the duration of the pre-synchronization phase to a final pre-synchronization fork velocity which is less than the breakaway velocity.

6. The method of claim 3, further comprising:
periodically sensing a position of the fork relative to the starting pre-synchronization position during the pre-synchronization phase; and
adjusting the pre-synchronization fork velocity based on the position of the fork.

7. The method of claim 3, wherein the initial disengaged position and the starting pre-synchronization position are the same position.

8. The method of claim 3, wherein the starting pre-synchronization position is axially between the initial disengaged position and the intermediate pre-synchronization position.

9. The method of claim 1, wherein:
movement of the actuator fork is controlled by the actuator including an actuator piston operatively connected to the actuator fork;
the method further comprising:
controlling the pre-synchronization velocity of the actuator fork by applying a fluid pressure at an applied fluid pressure value to a first side of the actuator piston and controlling fluid flow at a controlled fluid flow value from a second side of the actuator piston.

10. The method of claim 9, wherein fluid pressure is applied to the first side of the actuator piston using a pressure solenoid and fluid flow from a second side of the actuator piston is controlled using a flow solenoid disposed in series with the pressure solenoid.

11. The method of claim 9, further comprising:
sensing a position of the fork relative to the starting pre-synchronization position at a predetermined time during the pre-synchronization phase; and
adjusting one of the applied fluid pressure value and the controlled fluid flow value to adjust the pre-synchronization fork velocity based on the sensed position of the fork.

12. The method of claim 3, further comprising:
moving the actuator fork and the attached sleeve from the final pre-synchronization position through a synchronization phase to a target position such that the strut is released from the sleeve and the sleeve at the target position is in meshing engagement with the gear and the hub.

13. The method of claim 12, further comprising:
moving the actuator fork and the attached sleeve through the synchronization phase at a synchronization fork velocity which is different than the pre-synchronization fork velocity.

14. A method of adjusting a fluid signal to an actuator piston to control movement of an actuator fork of a transmission, wherein movement of the actuator fork is controlled by a pressure solenoid applying fluid pressure to a first side of the actuator piston, and a flow solenoid disposed in series with the pressure solenoid and controlling fluid flow from a second side of the actuator piston, the method comprising:
moving an actuator fork and a synchronizer sleeve of the synchronizer operatively attached to the actuator fork in a gear engagement direction from an initial disengaged position through a pre-synchronization phase of a synchronization event to a final pre-synchronization position by at least one of applying fluid pressure at a pre-synchronization fluid pressure value to the first side of the actuator piston and controlling fluid flow at a pre-synchronization fluid flow value from the second side of the actuator piston;
the synchronizer including the synchronizer sleeve in meshing engagement with a hub fixedly mounted to the shaft, and a ball strut assembly disposed between the hub and the sleeve;
wherein:
the actuator fork is operatively connected to the actuator piston;
the actuator piston is actuable to move the fork and the attached sleeve axially relative to an axis defined by the shaft;
the ball strut assembly includes a strut and a ball plunger configured such that the ball strut assembly is axially movable by axial movement of the sleeve when the ball plunger is retained by a detent defined by the sleeve;
the sleeve exerts a sleeve force on the ball plunger during axial movement of the sleeve by the fork, wherein the magnitude of the sleeve force is defined by the fluid pressure applied to the piston;
the ball plunger is characterized by a breakaway force such that when the sleeve force is greater than the breakaway force the ball plunger is displaced from the detent, thereby releasing the strut from the sleeve; and the breakaway force corresponds to at least one of a fluid pressure threshold value and a fluid flow threshold value;

the method further comprising:

controlling, for the duration of the pre-synchronization phase, at least one of the pre-synchronization fluid pressure value below the fluid pressure threshold value and the pre-synchronization fluid flow value below the fluid flow threshold value, such that the strut is retained to the sleeve for the duration of the pre-synchronization phase.

15. The method of claim 14, wherein the pre-synchronization phase includes:

moving the fork and the attached sleeve in the engagement direction from the initial disengaged position to a starting pre-synchronization position by at least one of applying fluid pressure at the pre-synchronization fluid pressure value and controlling fluid flow at the pre-synchronization fluid flow value;

wherein at the starting pre-synchronization position the ball plunger is retained by the detent of the sleeve such that the strut retained to the sleeve by the ball plunger is moveable in the engagement direction by axial movement of the sleeve;

moving the fork, the attached sleeve and the retained strut in the engagement direction from the starting pre-synchronization position to an intermediate pre-synchronization position by at least one of applying fluid pressure at the pre-synchronization fluid pressure value and controlling fluid flow at the pre-synchronization fluid flow value, where at the intermediate pre-synchronization position the retained strut makes contact with a blocker ring of the synchronizer;

wherein the blocker ring is rotatably mounted on the shaft and axially moveable between the synchronizer hub and a gear; and moving the fork, the attached sleeve and the retained strut at a pre-synchronization velocity in the direction of engagement from the intermediate pre-synchronization position to the final pre-synchronization position at the one of the pre-synchronization fluid pressure value and the pre-synchronization fluid flow value, such that the retained strut in contact with the blocker ring moves a blocker ring face of the blocker ring in frictional contact with a gear face of the gear.

16. The method of claim 15, wherein applying fluid pressure at the pre-synchronization fluid pressure value during the pre-synchronization phase further comprises:

moving the fork and attached sleeve from the initial disengaged position at an initial pre-synchronization fluid pressure value; and incrementally increasing the pre-synchronization fluid pressure value from the initial pre-synchronization fluid pressure value over the duration of the pre-synchronization phase to a final pre-synchronization fluid pressure value which is less than the fluid pressure threshold value.

17. The method of claim 15, further comprising:

periodically sensing a position of the fork relative to the starting pre-synchronization position during the pre-synchronization phase; and adjusting at least one of the pre-synchronization fluid pressure value and the pre-synchronization fluid flow value based on the position of the fork.

18. The method of claim 14, further comprising:

sensing a position of the fork relative to one of the initial disengaged position and the starting pre-synchronization position at a predetermined time during the pre-synchronization phase; and adjusting at least one of the pre-synchronization fluid pressure value and the pre-synchronization fluid flow value based on the sensed position of the fork.

19. A system for adjusting a fluid signal to an actuator piston to control movement of an actuator fork of a transmission, wherein movement of the actuator fork is controlled by a pressure solenoid applying fluid pressure to a first side of the actuator piston, and a flow solenoid disposed in series with the pressure solenoid and controlling fluid flow from a second side of the actuator piston, the system comprising:

a controller programmed to move an actuator fork and a synchronizer sleeve of the synchronizer operatively attached to the actuator fork in a gear engagement direction from an initial disengaged position through a pre-synchronization phase of a synchronization event to a final pre-synchronization position by at least one of applying fluid pressure at a pre-synchronization fluid pressure value to the first side of the actuator piston and controlling fluid flow at a pre-synchronization fluid flow value from the second side of the actuator piston;

the synchronizer including the synchronizer sleeve in meshing engagement with a hub fixedly mounted to the shaft, and a ball strut assembly disposed between the hub and the sleeve;

wherein:

the actuator fork is operatively connected to the actuator piston;

the actuator piston is actuable to move the fork and the attached sleeve axially relative to an axis defined by the shaft;

the ball strut assembly includes a strut and a ball plunger configured such that the ball strut assembly is axially movable by axial movement of the sleeve when the ball plunger is retained by a detent defined by the sleeve;

the sleeve exerts a sleeve force on the ball plunger during axial movement of the sleeve by the fork, wherein the magnitude of the sleeve force is defined by the fluid pressure applied to the piston;

the ball plunger is characterized by a breakaway force such that when the sleeve force is greater than the breakaway force the ball plunger is displaced from the detent, thereby releasing the strut from the sleeve; and the breakaway force corresponds to at least one of a fluid pressure threshold value and a fluid flow threshold value;

the controller operable to control, for the duration of the pre-synchronization phase, at least one of the pre-synchronization fluid pressure value below the fluid pressure threshold value and the pre-synchronization fluid flow value below the fluid flow threshold value, such that the strut is retained to the sleeve for the duration of the pre-synchronization phase.

20. The system of claim 19, wherein the controller is operable to:

control movement of the actuator fork from the initial disengaged position through the pre-synchronization phase to the final pre-synchronization position;

measure the time required to move the actuator fork from a first position to a second position during the pre-synchronization phase;

wherein the first position is one of the initial disengaged position, a starting position, and another position axially between the initial disengaged position and the final pre-synchronization position, and the second position is one of the final pre-synchronization position and another position axially between the first position and the final pre-synchronization position;

determine if the measured time is less than a predefined minimum time for moving from the first position to the second position while exerting less than the breakaway force; and adjust the pre-synchronization fluid pressure value to a lower value when the measured time is less than the predefined minimum time.

\* \* \* \* \*